UNITED STATES PATENT OFFICE.

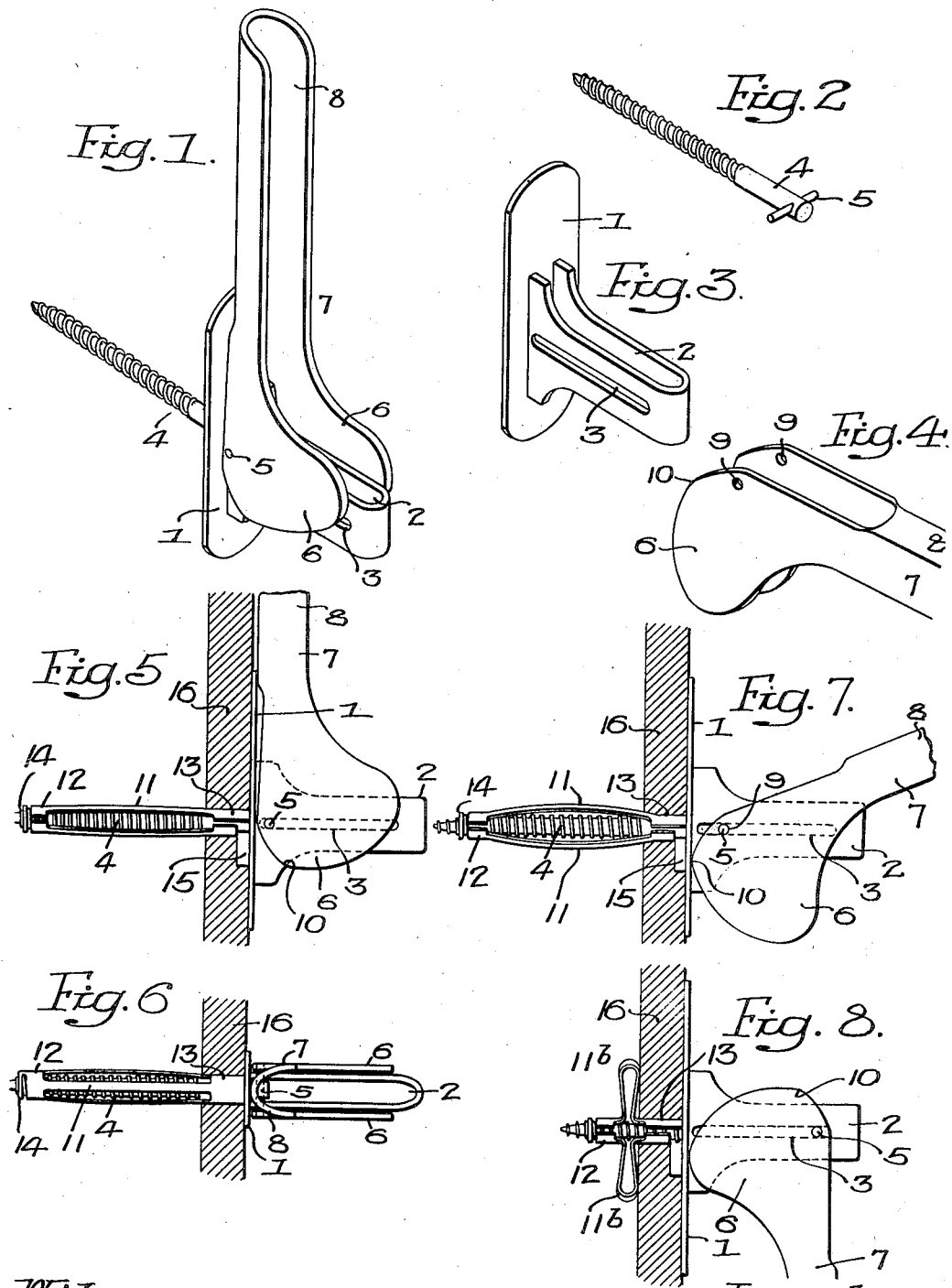

IRA B. MALABY, OF PHILADELPHIA, PENNSYLVANIA, ASSIGNOR TO NORMAN MELLOR, OF PHILADELPHIA, PENNSYLVANIA.

COLLAPSING TOOL.

1,102,937.

Specification of Letters Patent.

Patented July 7, 1914.

Application filed July 9, 1913. Serial No. 778,113.

*To all whom it may concern:*

Be it known that I, IRA B. MALABY, a citizen of the United States, residing in Philadelphia, Pennsylvania, have invented certain Improvements in Collapsing Tools, of which the following is a specification.

My invention consists of a novel device for collapsing or spreading wall anchors, particularly those of the type described and claimed in my application for U. S. Patent No. 693,546, filed April 27, 1912, one object of the invention being to provide a relatively simple, substantial and conveniently operated device whereby a wall anchor, expansion bolt or other holding structure of a similar nature may, after its insertion in a suitable hole or recess, be so acted upon that its inner end may be forcibly drawn toward the other end thereof with a consequent spreading or collapsing of the relatively weak side members connecting said ends in order to permanently fasten said anchor, etc., in the hole.

Another object of the invention is to provide a collapsing tool of such design that under operating conditions a relatively great force may be available for giving a wall anchor or other holding device, an initial "break" or collapse, and thereafter applying a decreased force for completing the collapse of said structure. I also desire to provide a tool accomplishing the above noted objects whose construction shall be such that it is practically impossible to operate it in any but the proper manner, with the idea of insuring that the wall anchor or other holding device on which it is used shall be fully and properly expanded or placed in the wall or other structure to which it is applied.

These objects and other advantageous ends I secure as hereinafter set forth, reference being had to the accompanying drawings, in which, Figure 1 is a perspective view of a collapsing tool constructed according to my invention; Figs. 2, 3 and 4 are detached perspective views illustrating the various parts going to make up the tool shown in Fig. 1; Figs. 5 and 6 are respectively a side elevation and a plan, showing my collapsing tool as applied to a wall anchor ready to collapse the same; and Figs. 7 and 8 are side elevations respectively illustrating the tool in two positions occupied under operating conditions, in the first of which the wall anchor is shown as having just received its initial collapse, while in the latter, the anchor is shown as fully collapsed.

In the above drawings the frame of the tool is shown as consisting of a plate 1 to which is rigidly attached a U-shaped yoke piece 2 projecting at right angles and provided in its opposite members or arms with slots 3 forming guideways. Mid-way between the two side members of the yoke piece 2 there is provided a hole in the plate 1 for the passage of a longitudinally movable bolt or screw 4, which at its outer and unthreaded end has fixed to or mounted in it a transverse pivot pin 6 slidable in the slots 3 and entering the side members 6 of an operating handle 7. These side members preferably lie parallel with and outside of the side members of the yoke piece 2 and are preferably formed of pressed out sheet metal integral with the handle proper 8. The handle member 7 has side members 6 formed with their edges in the shape of cams designed to co-act with the flat outer face of the plate 1 and as shown in Figs. 5 to 8, that part of each edge immediately adjacent the hole 9 for the reception of the pivot pin 5, curves away from said hole with relatively great eccentricity; that is to say, the parts of the curved edge of the side members 6 immediately adjacent the pivot holes 9 have a relatively steep pitch or great eccentricity relative to said holes, while that portion of each curved edge from the point 10 thereof outwardly, has an eccentricity relative to the pivot hole materially less than that of the part 9. With the above construction it is obvious that the handle may be turned about the line of the pivot 5 as a center and that the screw or bolt 4 which is threaded at its outer end, is movable bodily toward and from the body plate 1.

The particular tool described and illustrated is primarily designed for the purpose of collapsing wall anchors of the type illustrated in my application for patent above referred to, and in Figs. 5 to 8 I have illustrated such a wall anchor, which may be roughly described as consisting of a tubular body formed by laterally weak members 11 attached at their opposed ends to two tubular portions 12 and 13. A part of the portion 12 has the form of a tongue 14 turned over to lie in a plane substantially at right angles to the line of the body of the anchor and preferably made in a helical form so as to receive the threads of the screw 4, in the proper manner. The opposite end 13 of the wall anchor has a laterally extended portion 15 designed to cut into or be embedded within the plaster or other wall structure 16 in which the anchor is to be mounted.

Under conditions of use a hole is formed through or in the wall or other structure 16 and in this the wall anchor is inserted, as shown in Figs. 5 and 6. The screw or bolt 4 of the collapsing tool above described is then entered in the anchor and after its pointed end has been engaged with the helical or other nut formed by the tongue 4, said tool as a whole is rotated to cause the threads of said screw to enter said nut, the rotation being continued until the plate 1 comes firmly into contact with outer face of the wall structure 16. Under these conditions the handle 8 of the tool would lie at a small angle to the plane of the wall in the position shown in Fig. 6, so that the cam shaped edges of the side members 6 would have those portions immediately adjacent to the pivot pin 5 in engagement with the face of said plate. Thereafter the handle 8 would be drawn outwardly from the wall and thus be rotated on the pivot pin as an axis, thereby causing portions 9 of the side member edges to successively come into engagement with the plate 1. The screw 4 is consequently drawn outwardly with a relatively great force owing to the comparatively small distance between the pivot pin 5 and the points of contact of the curved edges 9 with the plate 1, as compared to the distance from said pivot pin to the point on the handle 8 grasped by the operator. Owing to the exertion of this relatively great force, the wall anchor, which originally has its side members 11 slightly bowed, assumes the broken form illustrated in Fig. 7 and thereafter, as the handle of the collapsing tool is moved from the position shown in said figure to that shown in Fig. 8, the side members are completely collapsed by reason of the outward movement of the screw and the coming together of the tubular portions 12 and 13, so that said relatively weak side members assume the form illustrated at 11$^b$. If the laterally extending projection 15 of the wall anchor has not previously been embedded in the wall, the above noted operation causes it to be forced into the position shown in Fig. 8 so that thereafter the collapsing tool may be removed by being given a reverse rotation such as will unscrew its bolt 4 from the nut 14. The wall anchor then constitutes a threaded socket in which a screw of suitable dimensions may be mounted in order to support any desired object.

From the above description it will be seen that the collapsing tool is of the simplest construction, is substantial as well as self contained and has its members so arranged that it is a practical impossibility for it to be used in any manner except so as to properly collapse the wall anchor or expansion bolt with which it is designed to be used. Moreover, the proportioning of its parts is such that the operator is enabled to easily exert the force necessary to initially collapse or break the wall anchor and thereafter quickly bring it to its fully collapsed position.

I claim:—

1. A collapsing tool consisting of a frame having a base plate and two side members projecting therefrom; a handle guided by said side members and having two similar cams operative on the base plate; an anchor-engaging member bodily movable through the plate; and a pivot connecting the anchor member with the cams of the handle.

2. A collapsing tool consisting of a frame having a base plate and a U-shaped yoke piece projecting therefrom, there being slots in the side members of said yoke piece; a screw bodily movable through the base plate; and a pivot pin for the screw extending through and beyond the side members of the yoke piece; with a handle terminating in two parallel cam plates respectively adjacent to the side members of the yoke piece and operatively mounted on the pivot pin.

3. The combination in a collapsing tool of a frame including a base plate; an anchor-engaging member movable bodily through said plate; and a handle guided on the frame and pivotally connected to said member; said handle having a cam operative on the plate and formed with a relatively steep "breaking" portion and a less steep collapsing portion.

4. The combination in a collapsing tool of a frame having a base plate and two slotted guides; a handle having two cams operative on the base plate; and a pivot pin extending between said cams and slidable in the slots; with an anchor engaging member suspended from said first pin and operative through the plate.

5. The combination in a collapsing tool of a base plate; a yoke piece fixed to said plate and having two parallel slots; an anchor-collapsing member; a pivot pin for said member; and a handle formed of a piece of sheet material, said handle having two parallel and integral side members formed to receive the yoke between them and constructed with their edges in the form of cams acting on the adjacent face of the base plate.

In testimony whereof, I have signed my name to this specification, in the presence of two subscribing witnesses.

IRA B. MALABY.

Witnesses:
 WILLIAM E. BRADLEY,
 WM. A. BARR.